(12) United States Patent
Lee et al.

(10) Patent No.: US 9,464,711 B2
(45) Date of Patent: Oct. 11, 2016

(54) HYDRAULIC PRESSURE SUPPLY SYSTEM OF AUTOMATIC TRANSMISSION FOR VEHICLE

(71) Applicant: Hyundai Motor Company, Seoul (KR)

(72) Inventors: Jihun Lee, Seoul (KR); Jin Young Hwang, Busan (KR); Se Hwan Jo, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 206 days.

(21) Appl. No.: 14/495,549

(22) Filed: Sep. 24, 2014

(65) Prior Publication Data

US 2015/0167837 A1 Jun. 18, 2015

(30) Foreign Application Priority Data

Dec. 18, 2013 (KR) .......................... 10-2013-0158821

(51) Int. Cl.
*F16H 61/21* (2006.01)
*F16H 61/00* (2006.01)
*F16H 61/44* (2006.01)

(52) U.S. Cl.
CPC ...... *F16H 61/0025* (2013.01); *F16H 61/0021* (2013.01); *F16H 61/0031* (2013.01); *F16H 61/44* (2013.01); *F16H 2061/0037* (2013.01); *Y10T 74/20024* (2015.01)

(58) Field of Classification Search
CPC .............................. F16H 61/0031; F16H 61/44
See application file for complete search history.

(56) References Cited

U.S. PATENT DOCUMENTS

| 9,234,578 B2* | 1/2016 | Hwang | F16H 61/38 |
| 9,291,078 B2* | 3/2016 | Wi | F01M 1/16 |
| 9,297,371 B2* | 3/2016 | Jo | F04B 49/002 |
| 2014/0096852 A1* | 4/2014 | Wi | F16H 1/0025 137/565.3 |
| 2014/0119948 A1* | 5/2014 | Wi | F04B 23/04 417/26 |
| 2014/0158236 A1* | 6/2014 | Jo | F16H 61/0021 137/565.13 |
| 2014/0290767 A1* | 10/2014 | Jo | F16H 61/0206 137/565.11 |
| 2014/0294599 A1* | 10/2014 | Wi | F16H 61/0021 417/2 |
| 2014/0294618 A1* | 10/2014 | Jo | F04B 23/04 417/286 |
| 2015/0027570 A1* | 1/2015 | Wi | F16H 61/0021 137/563 |
| 2015/0167835 A1* | 6/2015 | Hwang | F16H 61/0031 137/565.14 |

FOREIGN PATENT DOCUMENTS

| JP | 3827926 B2 | 9/2006 |
| JP | 4254516 B2 | 4/2009 |
| JP | 4385752 B2 | 12/2009 |

\* cited by examiner

*Primary Examiner* — Derek D Knight
(74) *Attorney, Agent, or Firm* — Morgan, Lewis & Bockius LLP

(57) ABSTRACT

A hydraulic pressure supply system of an automatic transmission for a vehicle which generates a low hydraulic pressure and a high hydraulic pressure using oil stored in an oil pan and supplies the low hydraulic pressure and the high hydraulic pressure respectively to a low pressure portion and a high pressure portion may include a low-pressure hydraulic pump, a first switch valve, a low-pressure regulator valve, a high-pressure hydraulic pump, a second switch valve and a high-pressure regulator valve.

14 Claims, 4 Drawing Sheets

HYDRAULIC PRESSURE SUPPLY SYSTEM OF AUTOMATIC TRANSMISSION FOR VEHICLE

CROSS-REFERENCE TO RELATED APPLICATION

The present application claims priority to Korean Patent Application No. 10-2013-0158821 filed Dec. 18, 2013, the entire contents of which is incorporated herein for all purposes by this reference.

BACKGROUND OF THE INVENTION

1. Field of the Invention

The present invention relates to a hydraulic pressure supply system of an automatic transmission for a vehicle. More particularly, the present invention relates to a hydraulic pressure supply system of an automatic transmission for a vehicle which prevents rise of motor RPM due to reduction of hydraulic pressure and improves fuel economy by supplying hydraulic pressure generated by both of a low-pressure hydraulic pump and a high-pressure hydraulic pump to a high pressure portion when shifting.

2. Description of Related Art

Recently, vehicle makers direct all their strength to improve fuel economy due to worldwide high oil prices and strengthening of exhaust gas regulations.

Improvement of fuel economy may be achieved by improving power delivery efficiency, and the improvement of the power delivery efficiency may be achieved by minimizing unnecessary power consumption of a hydraulic pump.

A recent automatic transmission is provided with a low-pressure hydraulic pump and a high-pressure hydraulic pump so as to improve fuel economy. Therefore, hydraulic pressure generated by the low-pressure hydraulic pump is supplied to a low pressure portion (i.e., a torque converter, a cooling device, and a lubrication device), and hydraulic pressure generated by the high-pressure hydraulic pump is supplied to a high pressure portion (i.e., friction members selectively operated when shifting).

In further detail, general hydraulic pressure of the automatic transmission is generated for the low pressure portion (i.e., generated by the low-pressure hydraulic pump), and hydraulic pressure demanded by the high pressure portion is generated by the high-pressure hydraulic pump and then is supplied to the high pressure portion.

Therefore, fuel economy may be improved by minimizing power consumption for driving the hydraulic pump, and noise and vibration may be reduced and durability may be improved by reducing load applied to the hydraulic pump.

However, according to a conventional hydraulic pressure supply system, hydraulic pressure generated only by the high-pressure hydraulic pump is supplied to the high pressure portion in shifting where much oil is necessary. Therefore, RPM of the hydraulic pump may be excessively increased in order to prevent pressure reduction at the high pressure portion.

In this case, driving loss of the hydraulic pump may occur and fuel economy may be deteriorated.

The above information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure supply system of an automatic transmission for a vehicle having advantages of preventing rise of motor RPM due to reduction of hydraulic pressure and improving fuel economy by supplying hydraulic pressure generated by both of a low-pressure hydraulic pump and a high-pressure hydraulic pump to a high pressure portion when shifting.

Various aspects of the present invention are directed to providing a hydraulic pressure supply system of an automatic transmission for a vehicle which may generate a low hydraulic pressure and a high hydraulic pressure using oil stored in an oil pan and may supply the low hydraulic pressure and the high hydraulic pressure respectively to a low pressure portion and a high pressure portion.

In an aspect of the present invention, a hydraulic pressure supply system may include a low-pressure hydraulic pump receiving the oil stored in the oil pan through an input line, generating the low hydraulic pressure, and discharging the low hydraulic pressure to a first low-pressure line, a first switch valve supplying the hydraulic pressure of the first low-pressure line selectively to a second low-pressure line or a first bypass line, a low-pressure regulator valve regulating the hydraulic pressure of the second low-pressure line to stable low hydraulic pressure and supplying the stable low hydraulic pressure to the low pressure portion through a third low-pressure line, a high-pressure hydraulic pump increasing a portion of the hydraulic pressure supplied through the first low-pressure line to generate the high hydraulic pressure, and discharging the high hydraulic pressure to a high-pressure line, a second switch valve selectively supplying the hydraulic pressure supplied through the first bypass line to the high-pressure line through a second bypass line, and a high-pressure regulator valve regulating the hydraulic pressure supplied through the high-pressure line to stable high hydraulic pressure and supplying the stable high hydraulic pressure to the high pressure portion.

The first switch valve may be controlled by a control pressure supplied from a solenoid valve and elastic force of a first elastic member counteracting against the control pressure of the solenoid valve.

The low-pressure regulator valve may regulate the hydraulic pressure of the second low-pressure line to be stable by recirculating a portion of the hydraulic pressure supplied from the second low-pressure line through a first recirculation line, and may supply the regulated hydraulic pressure to the third low-pressure line.

The first recirculation line may be connected to the input line.

The second switch valve may be controlled by the hydraulic pressure supplied through the first bypass line and elastic force of a second elastic member counteracting against the hydraulic pressure of the first bypass line.

The control pressure operating the first switch valve may be weaker than that operating the second switch valve.

The high-pressure regulator valve may regulate the hydraulic pressure of the high-pressure line to be stable by recirculating a portion of the hydraulic pressure of the high-pressure line to the second low-pressure line through a second recirculation line, and may supply the regulated hydraulic pressure to the high pressure portion.

In another aspect of the present invention, a hydraulic pressure supply system of an automatic transmission for a vehicle which generates a low hydraulic pressure using oil stored in a first oil pan, generates a high hydraulic pressure using oil stored in a second oil pan, and supplies the low hydraulic pressure and the high hydraulic pressure respectively to a low pressure portion and a high pressure portion may include a low-pressure hydraulic pump receiving the oil stored in the first oil pan through an input line, generating the low hydraulic pressure, and discharging the low hydraulic pressure to a first low-pressure line, a first switch valve supplying the hydraulic pressure of the first low-pressure line selectively to a second low-pressure line or a first bypass line, a low-pressure regulator valve regulating the hydraulic pressure of the second low-pressure line to stable low hydraulic pressure and supplying the stable low hydraulic pressure to the low pressure portion through a third low-pressure line, a high-pressure hydraulic pump receiving the oil stored in the second oil pan, generating the high hydraulic pressure, and discharging the high hydraulic pressure to a high-pressure line, a second switch valve selectively supplying the hydraulic pressure supplied through the first bypass line to the high-pressure line through a second bypass line, and a high-pressure regulator valve regulating the hydraulic pressure supplied through the high-pressure line to stable high hydraulic pressure and supplying the stable high hydraulic pressure to the high pressure portion.

The first switch valve may be controlled by a control pressure supplied from a solenoid valve and elastic force of a first elastic member counteracting against the control pressure of the solenoid valve.

The low-pressure regulator valve may regulate the hydraulic pressure of the second low-pressure line to be stable by recirculating a portion of the hydraulic pressure supplied from the second low-pressure line through a first recirculation line, and may supply the regulated hydraulic pressure to the third low-pressure line.

The first recirculation line may be connected to the input line.

The second switch valve may be controlled by the hydraulic pressure supplied through the first bypass line and elastic force of a second elastic member counteracting against the hydraulic pressure of the first bypass line.

The control pressure operating the first switch valve may be weaker than that operating the second switch valve.

The high-pressure regulator valve may regulate the hydraulic pressure of the high-pressure line to be stable by recirculating a portion of the hydraulic pressure of the high-pressure line to the second low-pressure line through a second recirculation line, and may supply the regulated hydraulic pressure to the high pressure portion.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
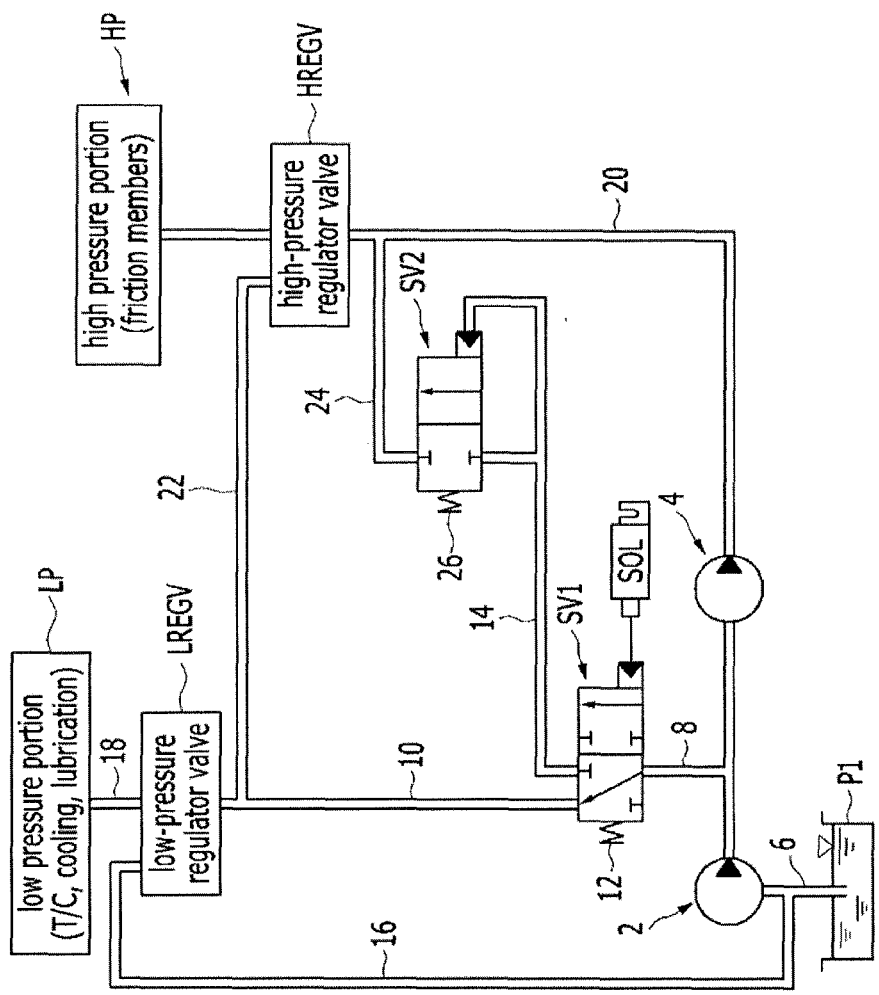
FIG. 1 is a schematic diagram of a hydraulic pressure supply system illustrating normal operation according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining various exemplary embodiments will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a hydraulic pressure supply system illustrating normal operation according to various exemplary embodiments of the present invention.

Referring to FIG. 1, a hydraulic pressure supply system according to various embodiments of the present invention is adapted to supply a low hydraulic pressure generated by a low-pressure hydraulic pump 2 to a low pressure portion LP such as a torque converter (T/C), a cooling portion, and a lubrication portion and to supply a high hydraulic pressure generated by a high-pressure hydraulic pump 4 to a high pressure portion HP for operating friction members related to shifting.

The low hydraulic pressure is a lower pressure facilitating operation of the torque converter (T/C) and cooling and lubrication, and the high hydraulic pressure is a high pressure facilitating operation of a plurality of friction members.

The low hydraulic pressure is generated by the low-pressure hydraulic pump 2 and is supplied to the low pressure portion LP through a low-pressure regulator valve LREGV, and the high hydraulic pressure is generated at the high-pressure hydraulic pump 4 by increasing a portion of the hydraulic pressure generated by the low-pressure hydraulic pump 2 and is supplied to the high pressure portion HP through a high-pressure regulator valve HREGV.

Various embodiments of the present invention include first and second switch valves SV1 and SV2 selectively supplying the hydraulic pressure of the low-pressure hydraulic pump 2 to the high pressure portion HP.

In further detail, the low-pressure hydraulic pump 2, as well known to a person of an ordinary skill in the art, may be a mechanical pump driven by torque of an engine or an electric pump driven by a motor.

The low-pressure hydraulic pump 2 is connected to an oil pan P1 through an input line 6, and the low hydraulic pressure generated by the low-pressure hydraulic pump 2 is discharged to a first low-pressure line 8. The low hydraulic pressure is supplied to the low pressure portion LP through the first switch valve SV1, a second low-pressure line 10, and the low-pressure regulator valve LREGV.

The first switch valve SV1 is a spool valve and is controlled by a control pressure of a solenoid valve SOL and elastic force of an elastic member 12 counteracting against the control pressure of the solenoid valve so as to supply the hydraulic pressure of the first low-pressure line 8 selectively to the second low-pressure line 10 or a first bypass line 14. The hydraulic pressure supplied to the first bypass line 14 is supplied to the second switch valve SV2.

The low-pressure regulator valve LREGV recirculates a portion of the hydraulic pressure supplied from the second low-pressure line 10 to the input line 6 through a first recirculation line 16 so as to regulate the hydraulic pressure. The hydraulic pressure regulated by the low-pressure regulator valve LREGV is supplied to the low pressure portion LP through a third low-pressure line 18.

The high-pressure hydraulic pump 4 may be an electric pump driven by a motor. The high-pressure hydraulic pump 4 increases the low hydraulic pressure supplied through the first low-pressure line 8 to the high hydraulic pressure, and discharges the high hydraulic pressure to a high-pressure line 20.

In addition, the hydraulic pressure discharged from the high-pressure hydraulic pump 4 to the high-pressure line 20 is regulated to be stable by the high-pressure regulator valve HREGV and is then supplied to the high pressure portion HP.

The high-pressure regulator valve HREGV recirculates a portion of the hydraulic pressure supplied through the high-pressure line 20 to the low pressure portion LP through a second recirculation line 22 and regulates the high hydraulic pressure to be stable. In addition, the second recirculation line 22 is connected to the second low-pressure line 10.

The second switch valve SV2 is disposed between the first bypass line 14 and a second bypass line 24 connected to the high-pressure line 20, and selectively supplies the hydraulic pressure supplied through the first bypass 14 to the high pressure portion HP through the second bypass line 24.

For this purpose, the second switch valve SV2 is a spool valve and is controlled by the hydraulic pressure of the first bypass line 14 and elastic force of an elastic member 26 counteracting against the hydraulic pressure of the first bypass line 14.

In the hydraulic pressure supply system according to various embodiments of the present invention, the hydraulic pressure of the low-pressure hydraulic pump 2 is supplied to the low pressure portion LP through the first low-pressure line 8, the first switch valve SV1, the second low-pressure line 10, and the low-pressure regulator valve LREGV, and the hydraulic pressure of the high-pressure hydraulic pump 4 is supplied to the high pressure portion HP through the high-pressure line 20 and the high-pressure regulator valve HREGV at normal operation.

Figure 2:
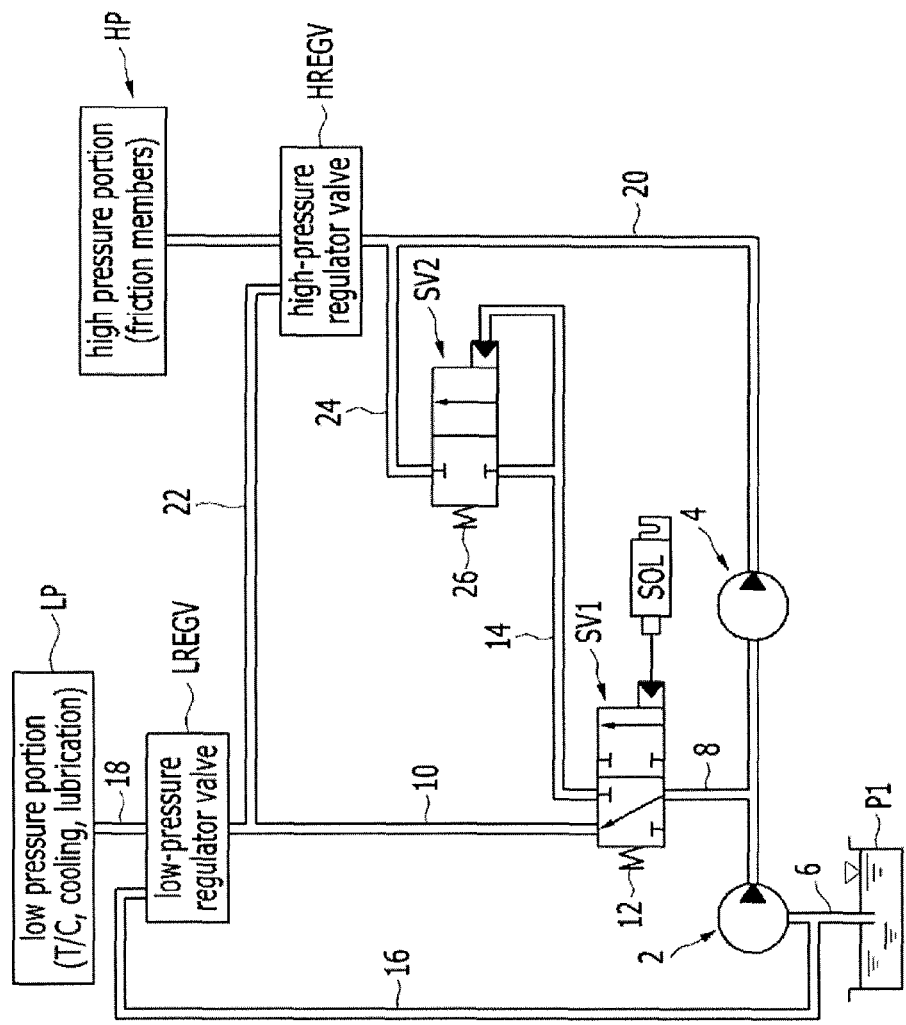
FIG. 2 is a schematic diagram of a hydraulic pressure supply system illustrating operation at shifting according to various exemplary embodiments of the present invention.

FIG. 2 is a schematic diagram of a hydraulic pressure supply system illustrating operation at shifting according to various exemplary embodiments of the present invention.

Referring to FIG. 2, in the hydraulic pressure supply system according to various embodiments of the present invention, the hydraulic pressure of the high-pressure hydraulic pump 4 is supplied to the high pressure portion HP, and first switch valve SV1 connects the first low-pressure line 8 to the first bypass line 14 by control of the solenoid valve SOL when shifting. Therefore, the hydraulic pressure of the first low-pressure line 8 is supplied to the first bypass line 14.

In addition, if the hydraulic pressure of the first bypass line 14 is higher than a predetermined pressure, the second switch valve SV2 connects the first bypass line 14 to the second bypass line 24. Therefore, the hydraulic pressure of the first bypass line 14 is supplied to the high-pressure line 20 through the second bypass line 24.

That is, since the hydraulic pressure generated by both of the low-pressure hydraulic pump 2 and the high-pressure hydraulic pump 4 is supplied to the high pressure portion HP when shifting, RPM rise of the high-pressure hydraulic pump 4 may be minimized. Therefore, driving loss may be reduced and fuel economy may be enhanced.

At this time, the control pressure operating the first switch valve SV1 is weaker than that operating the second switch valve SV2.

Figure 3:
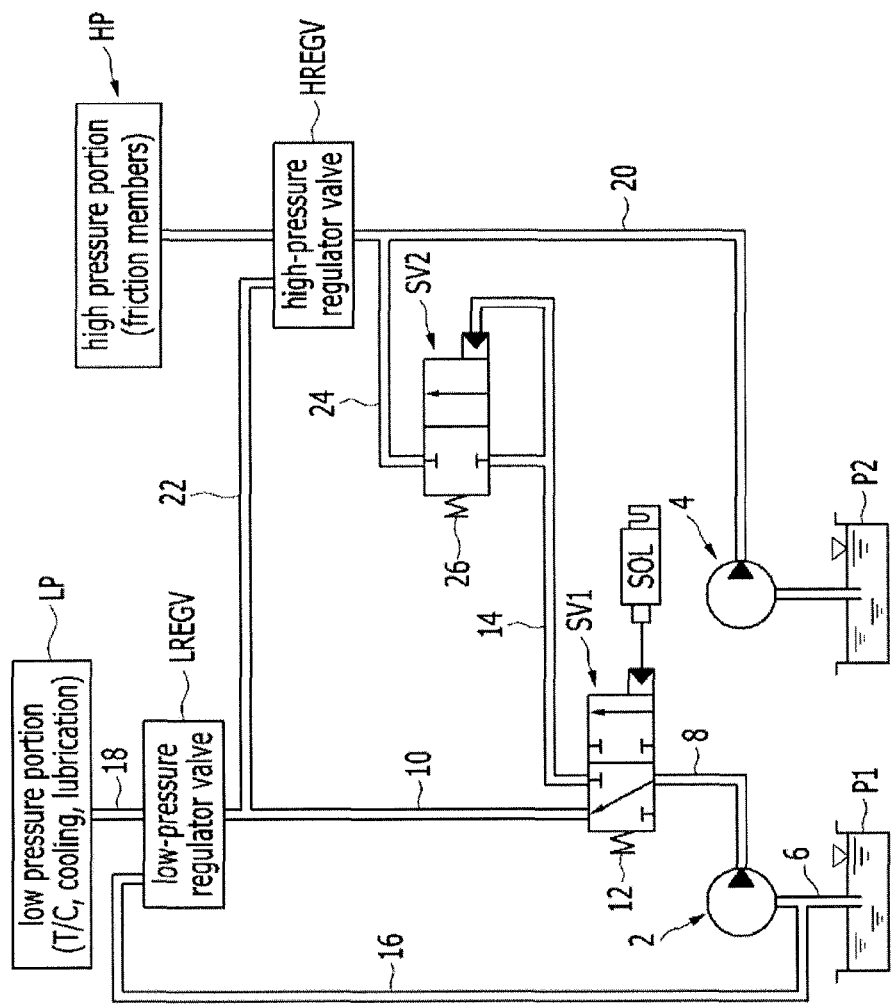
FIG. 3 is a schematic diagram of a hydraulic pressure supply system illustrating normal operation according to various exemplary embodiments of the present invention.

FIG. 3 is a schematic diagram of a hydraulic pressure supply system illustrating normal operation according to various exemplary embodiments of the present invention.

Referring to FIG. 3, in the hydraulic pressure supply system according to various embodiments of the present invention, the low-pressure hydraulic pump 2 and the high-pressure hydraulic pump 4 have independent oil pans P1 and P2, respectively.

That is, the high-pressure hydraulic pump 4 increases a portion of the hydraulic pressure supplied from the low-pressure hydraulic pump 2 and supplies the increased hydraulic pressure to the high pressure portion HP in the exemplary embodiment described above, but the high-pressure hydraulic pump 4 pumps the oil stored in an additional oil pan P2.

Therefore, in the hydraulic pressure supply system, the low hydraulic pressure discharged from the low-pressure hydraulic pump 2 is supplied to the low pressure portion LP and the high hydraulic pressure discharged from the high-pressure hydraulic pump 4 is supplied to the high pressure portion HP at normal operation.

Figure 4:
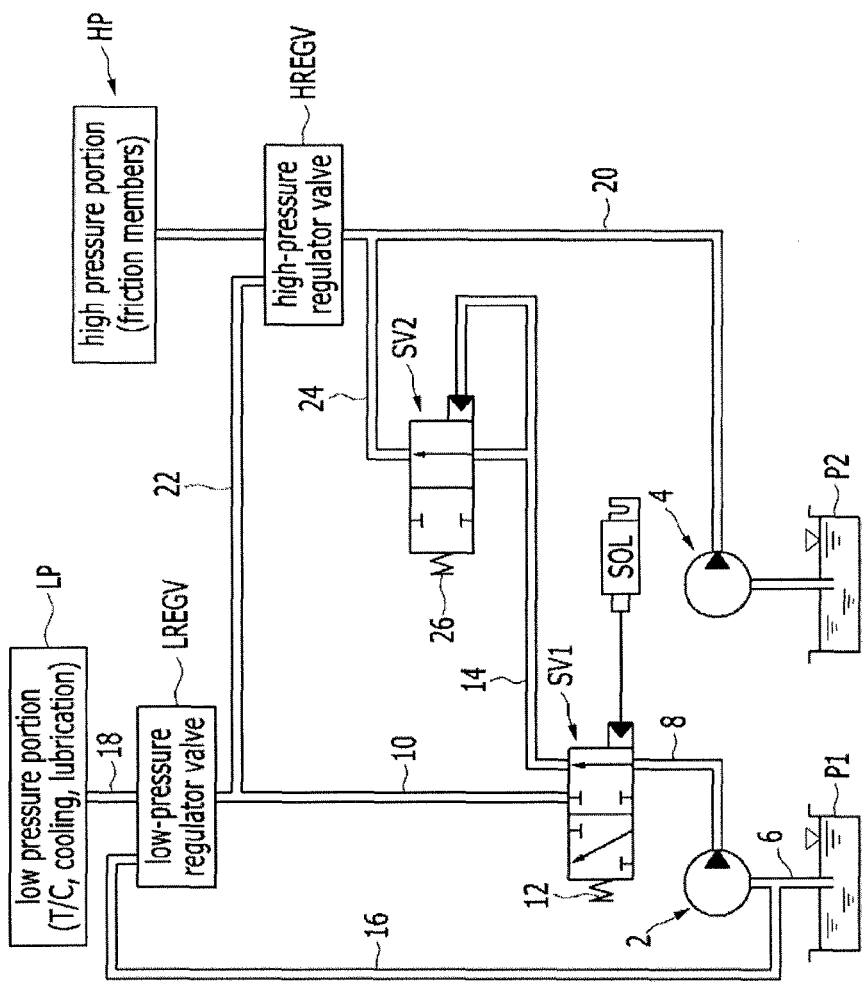
FIG. 4 is a schematic diagram of a hydraulic pressure supply system illustrating operation at shifting according to various exemplary embodiments of the present invention.

FIG. 4 is a schematic diagram of a hydraulic pressure supply system illustrating operation at shifting according to various exemplary embodiments of the present invention.

Referring to FIG. 4, in the hydraulic pressure supply system according to various embodiments of the present invention, the high hydraulic pressure discharged from the high-pressure hydraulic pump 4 is supplied to the high pressure portion HP and the hydraulic pressure discharged from the low-pressure hydraulic pump 2 is supplied to the high pressure portion HP through the first and second switch valves SV1 and SV2 when shifting.

In the hydraulic pressure supply system according to various embodiments of the present invention, the hydraulic pressure generated by both of a low-pressure hydraulic pump and a high-pressure hydraulic pump is supplied to the high pressure portion when shifting. Therefore, RPM rise of the hydraulic pump for compensating hydraulic pressure reduction at the high pressure portion may be prevented.

Therefore, driving loss may not occur and fuel economy may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A hydraulic pressure supply system of an automatic transmission for a vehicle which generates a low hydraulic pressure and a high hydraulic pressure using oil stored in an oil pan and supplies the low hydraulic pressure and the high hydraulic pressure respectively to a low pressure portion and a high pressure portion, the hydraulic pressure supply system comprising:
   a low-pressure hydraulic pump receiving the oil stored in the oil pan through an input line, generating the low hydraulic pressure, and discharging the low hydraulic pressure to a first low-pressure line;
   a first switch valve supplying the hydraulic pressure of the first low-pressure line selectively to a second low-pressure line or a first bypass line;
   a low-pressure regulator valve regulating hydraulic pressure of the second low-pressure line to stable low hydraulic pressure and supplying the stable low hydraulic pressure to the low pressure portion through a third low-pressure line;
   a high-pressure hydraulic pump increasing a portion of the hydraulic pressure supplied through the first low-pressure line to generate the high hydraulic pressure, and discharging the high hydraulic pressure to a high-pressure line;
   a second switch valve selectively supplying the hydraulic pressure supplied through the first bypass line to the high-pressure line through a second bypass line; and
   a high-pressure regulator valve regulating the hydraulic pressure supplied through the high-pressure line to stable high hydraulic pressure and supplying the stable high hydraulic pressure to the high pressure portion.

2. The hydraulic pressure supply system of claim 1, wherein the first switch valve is controlled by a control pressure supplied from a solenoid valve and elastic force of a first elastic member counteracting against the control pressure of the solenoid valve.

3. The hydraulic pressure supply system of claim 1, wherein the low-pressure regulator valve regulates the hydraulic pressure of the second low-pressure line to be stable by recirculating a portion of the hydraulic pressure supplied from the second low-pressure line through a first recirculation line, and supplies the regulated hydraulic pressure to the third low-pressure line.

4. The hydraulic pressure supply system of claim 3, wherein the first recirculation line is connected to the input line.

5. The hydraulic pressure supply system of claim 1, wherein the second switch valve is controlled by the hydraulic pressure supplied through the first bypass line and elastic force of a second elastic member counteracting against the hydraulic pressure of the first bypass line.

6. The hydraulic pressure supply system of claim 1, wherein the control pressure operating the first switch valve is weaker than that operating the second switch valve.

7. The hydraulic pressure supply system of claim 1, wherein the high-pressure regulator valve regulates the hydraulic pressure of the high-pressure line to be stable by recirculating a portion of the hydraulic pressure of the high-pressure line to the second low-pressure line through a second recirculation line, and supplies the regulated hydraulic pressure to the high pressure portion.

8. A hydraulic pressure supply system of an automatic transmission for a vehicle which generates a low hydraulic pressure using oil stored in a first oil pan, generates a high hydraulic pressure using oil stored in a second oil pan, and supplies the low hydraulic pressure and the high hydraulic pressure respectively to a low pressure portion and a high pressure portion, the hydraulic pressure supply system comprising:
   a low-pressure hydraulic pump receiving the oil stored in the first oil pan through an input line, generating the low hydraulic pressure, and discharging the low hydraulic pressure to a first low-pressure line;
   a first switch valve supplying the hydraulic pressure of the first low-pressure line selectively to a second low-pressure line or a first bypass line;
   a low-pressure regulator valve regulating hydraulic pressure of the second low-pressure line to stable low hydraulic pressure and supplying the stable low hydraulic pressure to the low pressure portion through a third low-pressure line;
   a high-pressure hydraulic pump receiving the oil stored in the second oil pan, generating the high hydraulic pressure, and discharging the high hydraulic pressure to a high-pressure line;
   a second switch valve selectively supplying the hydraulic pressure supplied through the first bypass line to the high-pressure line through a second bypass line; and
   a high-pressure regulator valve regulating the hydraulic pressure supplied through the high-pressure line to stable high hydraulic pressure and supplying the stable high hydraulic pressure to the high pressure portion.

9. The hydraulic pressure supply system of claim 8, wherein the first switch valve is controlled by a control pressure supplied from a solenoid valve and elastic force of a first elastic member counteracting against the control pressure of the solenoid valve.

10. The hydraulic pressure supply system of claim 8, wherein the low-pressure regulator valve regulates the hydraulic pressure of the second low-pressure line to be stable by recirculating a portion of the hydraulic pressure supplied from the second low-pressure line through a first recirculation line, and supplies the regulated hydraulic pressure to the third low-pressure line.

11. The hydraulic pressure supply system of claim 10, wherein the first recirculation line is connected to the input line.

12. The hydraulic pressure supply system of claim 8, wherein the second switch valve is controlled by the hydraulic pressure supplied through the first bypass line and elastic force of a second elastic member counteracting against the hydraulic pressure of the first bypass line.

13. The hydraulic pressure supply system of claim 8, wherein the control pressure operating the first switch valve is weaker than that operating the second switch valve.

14. The hydraulic pressure supply system of claim 8, wherein the high-pressure regulator valve regulates the hydraulic pressure of the high-pressure line to be stable by recirculating a portion of the hydraulic pressure of the high-pressure line to the second low-pressure line through a second recirculation line, and supplies the regulated hydraulic pressure to the high pressure portion.

* * * * *